Sept. 8, 1964 J. H. NEHER 3,148,309

PILOT WIRE PROTECTIVE SYSTEM FOR TRANSMISSION LINES

Filed Aug. 23, 1960 3 Sheets-Sheet 1

INVENTOR
John H. Neher
BY
[signature]
ATTORNEYS

INVENTOR
John H. Neher
BY
ATTORNEYS

Sept. 8, 1964 J. H. NEHER 3,148,309

PILOT WIRE PROTECTIVE SYSTEM FOR TRANSMISSION LINES

Filed Aug. 23, 1960 3 Sheets-Sheet 3

INVENTOR
John H. Neher
BY
ATTORNEYS

United States Patent Office 3,148,309

Patented Sept. 8, 1964

3,148,309

PILOT WIRE PROTECTIVE SYSTEM FOR TRANSMISSION LINES

John H. Neher, 600 Sussex Road, Wynnewood, Pa.

Filed Aug. 23, 1960, Ser. No. 51,335

17 Claims. (Cl. 317—27)

The present invention relates to pilot wire protective systems of the character which are applied to transmission lines, especially for electric power distribution.

A purpose of the invention is to permit a pilot wire protective system to operate effectively notwithstanding high impedance in the pilot wires.

A further purpose is to permit local differential connections at each end, with utilization of the pilot wires merely to transmit information simultaneously from each end to the opposite end, so that the ability of the pilot wires to transmit substantial currents is no longer important.

A further purpose is to correct this information for phase and attenuation incident to a pilot wire system, so that relatively long protective pilot wire systems can be effectively used.

A further purpose is to permit the application of a pilot wire protective system to three-terminal transmission lines.

A further purpose is to employ pilot wires of smaller gauge and to permit utilization as pilot wires of telephone lines which are normally of smaller gauge.

A further purpose is to develop a pilot wire protective system which lends itself to the use of transistors as relay elements.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 1:
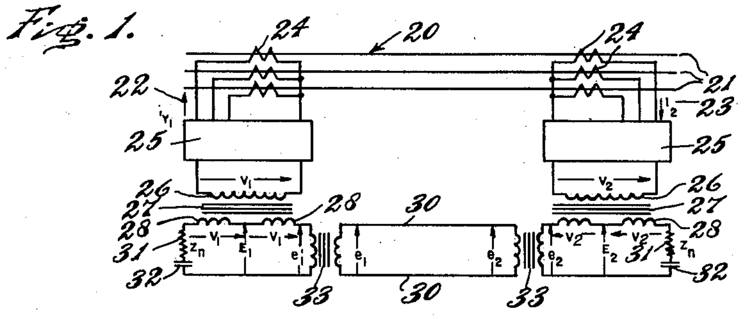
FIGURE 1 is a circuit diagram showing the basic principle on which the invention operates.

In the prior art, extensive use has been made of pilot wire protective systems of the character illustrated in my United States Patent 2,273,588, granted February 17, 1942, for Electric Protective Arrangement. It is common practice in such systems to utilize telephone lines as pilot wires. The pilot wires therefore become part of the protective system between the current transformers at the ends of the transmission line. The pilot wire when used at the prevailing conventional frequency of 60 cycles has distributed shunt capacitance and series resistance, the inductance being negligible, and when these parameters reach sufficient magnitudes, attenuation and undesirable phase shifts occur in the pilot wire circuit to such an extent that the system may not function correctly under certain operating conditions with telephone lines as pilot wires and conventional relays.

In the conventional system, voltages are derived from the currents at each line terminal, and these voltages are connected differentially over the pilot wire circuit. As the resistance of the pilot wires increases, less current can be carried by the pilot wires for a given permissible maximum voltage applied thereto, and therefore the required sensitivity of the relays increases.

This problem, if it were the only problem, might be overcome by amplification, but there is a further complication. The charging current of the pilot wires must be considered, and this increases as the length of the protective system increases, so that the charging current will tend to override or obscure the differential current. Finally, a point will be reached where the relay currents at either end will be relatively independent of the applied voltage at the opposite end, and under these circumstances the relay loses its ability to discriminate between an internal fault and an external fault. Before this point is reached, the effect of the opposite end voltage in decreasing or increasing the relay current will undergo a phase shift, and minimum differential current will not occur under conditions which represent a through fault. It is therefore this phase shift, along with inherent limitations on the sensitivity of a relay which can be obtained at reasonable cost, which impose a practical limitation of about 2000 ohms on the pilot wire resistance for a conventional pilot wire system.

In terms of length of line, this represents about 23 miles of a 19 gauge copper line of the character which was conventional telephone practice twenty years ago. The tendency, however, in recent years has been to use 24 gauge copper telephone conductors, and a 23 mile line of 24 gauge has a resistance of about 6300 ohms, while on the other hand the 2000 ohm limit in terms of 24 gauge copper conductors represents only a length of 7 miles.

The present invention overcomes this difficulty, and removes the limitation in line resistance which has formerly been encountered. In the present invention it is possible to use 24 gauge copper conductors for the pilot wires and still obtain practical lengths of 23 miles or greater. Unlike the prior art systems in which current flowing in the pilot wires was a vital consideration, the present invention utilizes the pilot wires exclusively to transmit information, that is, to apply voltage at the far end.

The differential connections in the device of the present invention are made locally at each end. Therefore the electrical impedance of the pilot wire is only important insofar as it causes signal attenuation and phase shift in the transmission of the information, and, in fact, these difficulties are desirably compensated for by amplifiers in the case of attenuation and phase shifting networks in the case of phase shift.

The present invention offers a further advantage in that it can readily be applied not only to two-terminal lines, but also to three-terminal lines.

Considering now FIGURE 1 in detail, the foregoing limitations are due to the use in the prior art of pilot wires as part of the differential circuit. In accordance with the present invention, it is merely necessary to transmit a voltage from the far end of the pilot wire to the near end, and simultaneously transmit a voltage from the near end to the far end. In the system of FIGURE 1, a transmission line 20 has conductors 21 (in the particular example three are shown), and opposite terminals 22 and 23. Inductively coupled to each conductor adjacent each terminal is a current transformer 24, and the current transformers at each end feed into a summation network 25, which may be of a character well known in the art, which is connected to the respective current transformers as shown, and which produces a single output voltage proportional to the current conditions in the different conductors of the transmission line. When reference is made herein to current conditions, it is intended to include the magnitude and phase relation of the current.

The output summation voltage $V_1$ or $V_2$ is applied in this case to the primary 26 of a bridging transformer 27 at each end of the line. The bridging transformer has at least two balanced secondary windings 28, and it will be evident that additional secondary windings may be employed if desired as well known in telephone practice. The bridging transformer secondary windings 28 are connected in series with the pilot wires 30, each end of the pilot wire line having a terminating impedance network, shown as including a resistor 31 and a capacitor 32 connected in series.

While it is by no means essential, it is often desirable to inductively couple the portion of the pilot wires at each end with an intermediate portion by line insulating transformers 33, which are desired to protect against transient effects and abnormal voltages, and to insulate the station equipment from the pilot wires.

It will be seen from FIGURE 1 that the voltage $V_1$ is developed at one terminal by the flow of the three secondary currents through the summation network 25 which is designed to produce a voltage which is present under load and all types of faults. The voltage $V_2$ is similarly developed at the far end of the line by the secondary currents from the current transformers 24 which are there present at the end of the line. It will be seen that the pilot wire circuit terminates at each end in the impedance $Z_n$ of the terminating network 31 and 32, which is made approximately equal to $Z_o$, the characteristic impedance of the pilot wire circuit at the operating frequency. It will be evident to those skilled in the art that the difference between $Z_n$ and $Z_o$ is due entirely to the electrical parameters of the insulating transformers 33, when used. The voltages $V_1$ and $V_2$ are respectively introduced into the pilot line by means of the bridging transformers 27 as shown.

If a telephone line is terminated in its characteristic impedance, the impedance looking into the line is also its characteristic impedance; that is, the line appears to be infinitely long. Thus the voltage $2V_1$ introduced by the bridging transformer sees an impedance on each side of voltage will appear at the point across from the intermediate connection between the bridging transformer secondaries 28 to the opposite side of the pilot wires as indicated by $E_1$.

At the corresponding position at the opposite end of the line as indicated at $E_2$, a voltage will appear, which corresponds to $V_1$, but is attenuated and shifted in phase.

In the equations the subscripts 1 and 2 in association with currents or voltages indicate their position at the near end and far end of the line, respectively. For a three-terminal line the subscript 3 refers to the tapped station. The use of a double subscript such as $E_{21}$ indicates a voltage appearing at the far end of the line resulting from a voltage $V_1$ applied at the near end of the line.

Assuming in FIGURE 1 that the voltage drops through the bridging transformer secondaries are negligible, the series impedance of each insulating transformer 33 (including any blocking capacitor, not shown, which is commonly employed as indicated at 50 and 50' in my patent above referred to) is $Z_t$ and the magnetizing impedance of the insulating transformer 33 is $Z_m$. From transmission line theory we know $$e_1 = e_2 \cosh\theta + i_2 Z_o \sinh\theta \text{ volts} \quad (1)$$

$$i_1 = i_2 \cosh\theta + \frac{e_2}{Z_o}\sinh\theta \text{ amperes} \quad (2)$$

where $\theta$ is the hyperbolic phase angle of the line and $Z_o$ is its characteristic impedance.

$$e_1' = i_1 Z_t + e_1;\ e_2' = e_2 - i_2 Z_t \text{ volts} \quad (3)$$

Assuming for the moment that $V_2$ is zero $$i_2 = \frac{e_2'}{Z_2} \text{ amperes} \quad (4)$$

where $$Z_2 = \frac{1}{\frac{1}{Z_n} + \frac{1}{Z_s} + \frac{1}{Z_m}} \text{ ohms} \quad (5)$$

in which $Z_s$ is the impedance connected across $E_{21}$. Substituting Equations 3 and 4 in Equations 1 and 2

$$e_1' = e_2'\left[\left(1 + 2\frac{Z_t}{Z_2}\right)\cosh\theta + \left\{\frac{Z_t}{Z_o}\left(1 + \frac{Z_t}{Z_2}\right) + \frac{Z_o}{Z_2}\right\}\sinh\theta\right]$$
$$= Ae_2' = AE_{21} \text{ volts} \quad (6)$$

where $E_{21}$ is the voltage appearing at $E_2$ due to $V_1$ $$i_1 = \frac{e_2'}{Z_o}\left[\frac{Z_o}{Z_2}\cosh\theta + \left(1 + \frac{Z_t}{Z_2}\right)\sinh\theta\right]$$
$$= B\frac{e_2'}{Z_o} \text{ amperes} \quad (7)$$

If the line insulating transformers are omitted, Equation 6 reduces to the following:

$$E_2 = \frac{V_1}{\cosh\theta + \left(1 + \frac{Z_o}{Z_s}\right)\sinh\theta} = \frac{V_1}{A} \text{ volts} \quad (8)$$

By means which will be described, comparison is made of the voltage, for example $V_1$, produced at one end corresponding to the condition in the line at that end, with a voltage for example $E_1$ at that end corresponding to the condition in the line at the opposite end, after making certain corrections to magnitude and phase to bring the magnitude and phase into consonance, and this comparison voltage is conveniently used to operate a relay as described below.

The effective impedance $Z_n$ looking into the circuit (neglecting the magnetizing impedance which is in parallel with it) is $$Z_n = \frac{e_1'}{i_1} = \frac{A}{B} Z_o \text{ ohms} \quad (9)$$

This is the impedance to which the terminating network 31 and 32 is set. Were it not for the magnetizing impedance the voltage at the near end at position $E_1$ due to $V_1$ would be zero. Considering the magnetizing impedance of the insulating transformer 33, it may be shown by Kirchoff's laws that $$E_{11} = -V_1\frac{Z_1}{Z_m} \text{ volts} \quad (10)$$

where $$Z_1 = \frac{1}{\frac{2}{Z_n} + \frac{1}{Z_s} + \frac{1}{Z_m}} \text{ ohms} \quad (11)$$

and that $$e_1' = V_1 (1 - Z_1/Z_m) \text{ volts} \quad (12)$$

By Equation 6 therefore $$E_{21} = \frac{V_1}{A}(1 - Z_1/Z_m) \text{ volts} \quad (13)$$

Consider now that the voltage $V_2$ is applied with $V_1$ equal to zero. Then for the connections shown $$E_{22} = V_2\frac{Z_1}{Z_m} \text{ volts} \quad (14)$$

$$E_{12} = \frac{-V_2}{Z}(1 - Z_1/Z_m) \text{ volts} \quad (15)$$

If both voltages $V_1$ and $V_2$ are applied simultaneously, the resultant voltages appearing at $E_1$ and $E_2$ are $$E_1 = E_{12} + E_{11} = \frac{-V_2}{A} - \frac{Z_1}{Z_m}\left(V_1 - \frac{V_2}{A}\right) \text{ volts} \quad (16)$$

$$E_2 = E_{21} + E_{22} = \frac{V_1}{Z} + \frac{Z_1}{Z_m}\left(V_2 - \frac{V_1}{A}\right) \text{ volts} \quad (17)$$

All of the parameters in Equation 8 are phasors, and it will thus be evident that $E_2$ lags $V_1$ by an angle which increases as $\theta$ increases. It is also evident that the ratio of $E_2$ to $V_1$ becomes smaller as $\theta$ increases.

It will be evident that for the same reason the voltage $V_2$ is transferred to position $E_1$. Thus for the connection shown $$E_1 = -V_2/A \text{ volts} \qquad (18)$$

These signal transferences take place simultaneously without interference.

It will be seen from the above discussion that the maximum length of pilot wire which may be employed will depend upon the amount of attenuation and phase shift which can be tolerated in the signal transmission. As indicated by Equation 8, these depend upon the magnitude of phasor parameter A and its phase angle. Theoretically, by employing amplifiers having sufficient gain, the limiting factor is the signal-to-noise ratio in the entire circuit and especially the pilot wires.

It has been determined that using the principles of the present invention, very much longer pilot wires can be used than in the prior art, limited only by the signal-to-noise ratio.

As indicated previously, the differential connection is established locally at each end of the pilot wire circuit. For the conventional percentage differential relay as applied to protection of a transmission line, a force $F_o$ proportional to the square of the phasor difference of the terminal currents, tends to close the relay contact against a mechanical restraining spring action $F_s$, and an electromagnetic restraining force proportional to the square of the adjacent terminal current. The relay at the $V_1$ end thus will operate if $$F_o = k_o\left(\frac{V_1 - V_2}{A}\right)^2 \geqq k_r V_1^2 + F_s \qquad (19)$$

Figure 2:
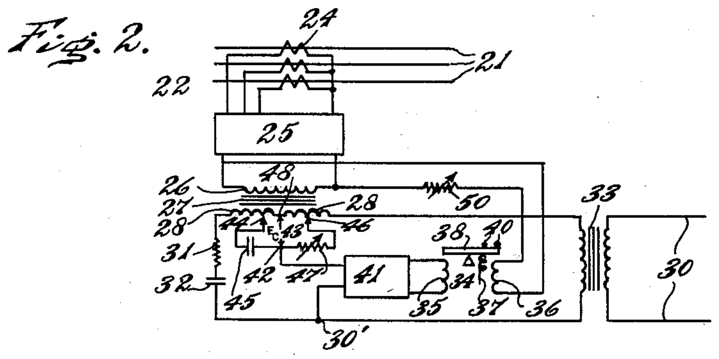
FIGURE 2 is a circuit diagram showing an embodiment of the invention which utilizes a differential relay.

Referring to FIGURE 2, which shows only one of the identical opposite ends of the transmission line and the protective system, it will be evident that a differential relay 34 is provided with an operating coil 35, a restraining coil 36 opposed thereto, and a biasing spring 37 applied to armature 38 to bias it to maintain contacts 40 normally open.

The operating coil receives the output from amplifier 41, whose input is obtained at one side from intermediate point 42 of phase correction and attenuating network 43, and connected at the other side to the opposite pilot wire 30'. The network 43 has one branch connected to adjusting contact 44 of one bridging transformer secondary 28, and then through one phase capacitor 45 to the intermediate connection 42. From the opposite bridging transformer secondary 28, there is an adjustable tap connection 46 through adjustable resistor 47 to the intermediate point 42 of the network. It will be evident from the foregoing, that on a through fault the voltage that corresponds to the far end condition, appears from midpoint 48 of the bridging transformer secondaries 28 to opposite pilot wire at 30'. On the other hand, a voltage $E_c$ between midpoint 48 of the bridging transformer secondaries 28 and intermediate point 42 of the network, is responsive to the voltage appearing at the near end across the pilot wires suitably shifted in phase and suitably attenuated by the network to make it consonant to the voltage between points 48 and 30' corresponding to the far end voltage.

The circuit of FIGURE 2, particularly in respect to the positions of the adjustable contacts 44 and 46 and the parameters of the capacitor 45 and resistor 47 is adjusted so that $$E_c = V_1/A \text{ volts} \qquad (20)$$

for conditions of a through fault.

The electromagnetic restraint relay coil 36 is suitably connected across the primary 26 of near-end bridging transformer 27 in circuit with variable resistor 50 which is adjusted to obtain the desired magnitude of electromagnetic restraint. This electromagnetic restraint is proportional to the near-end voltage.

Since only a very limited amount of power may be drawn from the differential circuit, the amplifier furnishes the power necessary for the operating current of the relay coil 35. A very simple amplifier is suitable, and it may be of the thermionic type or transistor type as desired.

Figure 3:
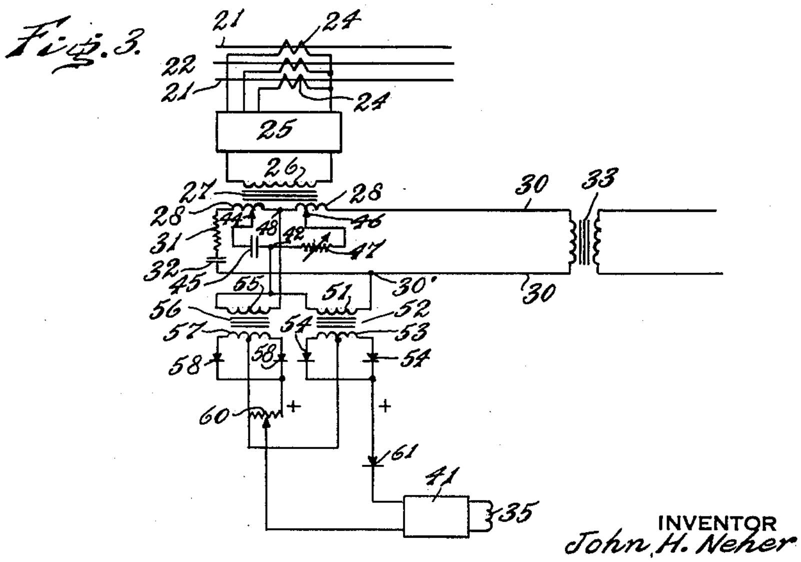
FIGURE 3 is a circuit diagram illustrating a preferred embodiment of the invention in which a single winding relay is utilized.

It will be evident that in FIGURE 2 the differential relay balances mechanical forces which are in part developed electromagnetically, and in part by the biasing spring. Instead, however, of balancing mechanical forces as shown in the device of FIGURE 2, it is in many cases more satisfactory to obtain rectified voltages, and oppose these voltages to produce an algebraic summation, and then supply this summation to an indicating device such as the operating coil of a simple relay. In FIGURE 3 the operating and restraining voltages are both rectified, and placed in series opposition and then supplied to the amplifier desirably but not necessarily through a blocking rectifier so that the amplifier will respond only when the operating voltage exceeds the restraining voltage. In this case the operating voltage appearing between points 42 and 30' is connected to the primary 51 of a transformer 52 whose secondary 53 is connected in a full wave rectifier circuit having rectifiers 54. The attenuated and phase corrected voltage between points 42 and 48 is used as the restraint voltage, and this is applied across primary 55 of transformer 56 whose secondary 57 is connected to a full wave rectifier circuit having rectifiers 58 in the same sense.

Center taps of transformer secondaries 53 and 57 are connected together. A potentiometer 60 is connected across between the center tap of transformer secondary 57 and the output. The adjustable contact of the potentiometer 60 is connected to one side of the input of amplifier 41. The output of full wave rectifiers 54 is connected to the other side of the input of the amplifier 41, through blocking rectifier 61 which is optionally used, depending upon the type of amplifier.

In FIGURE 2 it will be evident that for successful operation the resistance 47 should be adjusted for pilot wire length or resistance as well as the positions of the adjustments 44 and 46, in order to satisfy Equation 20. Also it will be evident that the restraint must be adjusted by manipulating variable resistor 50.

In the case of the device of FIGURE 3 however, the restraint is derived from $E_c$, which is proportioned to $V_1$, so that in case of change of pilot wire length or resistance after initial adjustment of the circuit has been made to satisfy Equation 20, there will be automatic adjustment of restraint, because it is derived from the same course, and it will also be in phase or directly out of phase with any operating voltage which can result on a through fault due to any condition of current transformer unbalance. The output of the amplifier is fed into a simple low energy relay 35, or it can operate a static relay mechanism such as silicon controlled rectifier in the trip circuit (not shown) as well known. It will be noted also that the current transformer burden of the circuit in FIGURE 3 may be reduced to a relatively low value, because of the low energy requirements of the circuit.

In some cases it is desirable to modify existing pilot wire relay systems to apply the principles of the present invention. The circuit of FIGURE 2 is directly applicable to one well known form of pilot wire differential relay, known commercially as HCB (Westinghouse).

Figure 4:
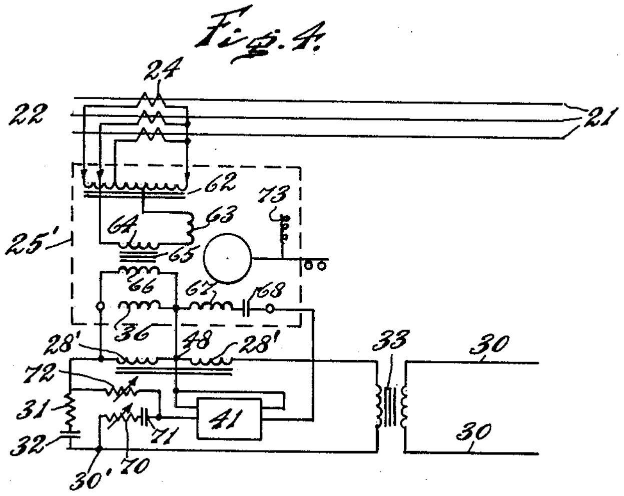
FIGURE 4 is a circuit digram showing an adaptation of the invention to one conventional type of relay.

In order to use another well known type of differential relay, known commercially as CPD (General Electric), it is desirable to employ a somewhat different circuit as shown in FIGURE 4. In this case the far end voltage $E_1$ which appears at the near end responsive to the condition at the far end appears across midpoint 48 between auto transformer windings 28' and 28' on the one hand, and opposite pilot wire 30'. In this case the mixing network 25' performs the function of the conventional mixing network, and also is combined with the relay. A mixing auto transformer 62 is connected to all the current transformers in the conventional manner (see my U.S. Patent 2,273,588) and the mixed output as well known is connected through polarizing coil 63 of the relay and primary 64 of input transformer 65 whose secondary 66 is connected across one of the bridging auto transformer windings 28'. The operating coil 67 of the relay is connected to the output of the amplifier through relay tuning capacitor 68 and the side of the operating coil 67 remote from the capacitor is connected to midpoint 48 of the auto transformer windings 28'. The restraining coil 36 of the relay is not utilized.

The input of the amplifier 41 at one side is from the midpoint 48 of the auto transformer windings 28'. The voltage at the near end between points 48 and 30' which corresponds to the voltage at the far end produces current which is fed into the amplifier 41 connected at the opposite side and is reduced by variable resistor 70 and phase shifted by capacitor 71. The voltage at the near end across the secondary of input transformer 66 produces a current which is reduced by resistor 72 and supplied across the input of the amplifier.

In operation it will be understood by reference to my U.S. patent above referred to, that the polarizing coil makes the relay responsive not only to magnitude but also to phase angle of current produced by the voltage from the far end. The voltage appearing at the near end which responds to the voltage at the far end produces a current therefore which tends to open the relay, and in order to create maximum effectiveness is shifted to bring it into phase with the voltage at the far end. The balancing closing force is due to the current produced by the voltage at the near end. The restraining force is simply accomplished by underbalancing by reducing the current which corresponds to the voltage at the near end. There is also a biasing spring provided at 73, biasing the relay toward opening.

The operation will be better understood from the operating equation in terms of symmetrical line currents as follows:

$$F_o = k_o I_1 (I_1 - I_2 \cos \phi) \geqq k_r I_1 (I_1) + F_s \qquad (21)$$

where $\phi$ is the phase angle of $I_2$ with respect to $I_1$, and $I_1$ and $I_2$ are scalar quantities. Equation 21 may be written in the following equivalent form $$k_o I_1 \left[ \left(1 + \frac{k_r}{k_o}\right) I_1 - I_2 \cos \phi \right] \geqq F_s \qquad (22)$$

In terms of the present system the quantities $I_1$ and $I_2$ within the brackets can be replaced by $V_1/z_1$ and $E_1/z_2 = V_2/Az_2$ respectively, so that $$k_o I_1 \left[ \left(1 + \frac{k_r}{k_o}\right) \frac{V_1}{z_1} \cos \beta_1 - \frac{V_2}{Az_2} \cos (\phi - \alpha - \beta_2) \right] \geqq F_s \qquad (23)$$

where $\beta_1$, $\beta_2$ and $\alpha$ are the phase angles of $z_1$, $z_2$ and A, respectively. To satisfy the phase angle and percentage restraint requirements, $z_1$ and $z_2$ must be so proportioned that $$\alpha + \beta_2 = 0 \text{ degrees} \qquad (24)$$

and $$z_1 = z_2 \left( \frac{A \cos \beta_1}{1 - k_r/k_o} \right) \text{ ohms} \qquad (25)$$

The ratio $k_r/k_o$ is dependent upon the percentage restraint desired, and is equal to ⅓ for a 50% restraint.

In FIGURE 4, $z_1$ is represented by $R_1 + Z_a$ and $z_2$ is represented by $R_2 + X_c + Z_a$, and where $Z_a$, the input impedance of the amplifier, is relatively small in respect to the other parameters mentioned. If the amplifier output current leads input current, $\beta_1$ and $\beta_2$ are effectively increased by a corresponding angle. This permits compensation for values of $\alpha$ as high as 90° in Equation 24.

In the discussion thus far, consideration has primarily been given to protection of lines having two-terminals. The invention is also conveniently applicable to protection of lines having three-terminals as shown in FIGURE 5.

Figure 5:
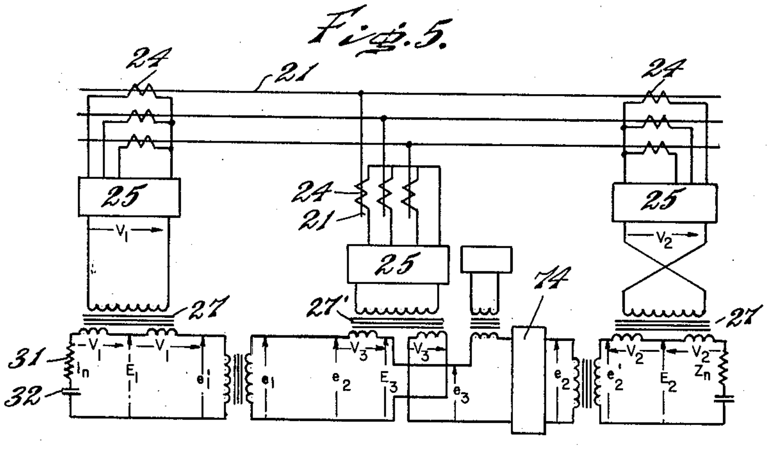
FIGURE 5 is a circuit diagram showing a three-terminal line equipped with a pilot wire protective device.

In FIGURE 5, the effective pilot wire length is equal to twice the longest pilot wire between the tapped station or intermediate terminal and either end terminal. In this form the pilot wires are run from the line terminals to the tapped station, and the physically shorter side of the line (thinking in terms of electrical parameters) is padded out by a padding network such as a ladder network 74 applied so as to place the bridging transformer 27 at the electrical center of the pilot wire circuit. Under this condition the transmission from one end to another will undergo the same attenuation and phase shift when passing through the center bridging transformer in either direction.

If the mixing network supplying the tapped terminal is designed to give an output voltage which is properly attenuated and shifted in phase angle by the amount which a signal coming from either end would be attenuated and shifted in reaching the center point, then it will be evident that a signal starting at the center point or from either end will arrive at the opposite end with the same degree of attenuation and phase shift. Thus the voltage appearing at $E_1$ due to $V_2$ and $V_3$ will be proportional to the phasor difference between the currents $I_2$ and $I_3$ and the voltage appearing at $E_2$ will be proportional to the phasor sum of the currents $I_1$ and $I_3$. Therefore, the relay systems previously described for the two-terminal lines will function correctly if installed at the ends of the three-terminal line, provided their internal circuitry is changed to correspond with the reversed connections of $V_2$ shown in FIGURE 5.

It may be shown that the current $i_3$ in the pilot wire at the tapped station is proportional to $I_1 + I_3 - I_2$, and thus this current may be used as a criterion for operating the relay at the tapped station. This current is applied to an insulating current transformer 75 and suitably amplified to apply to a relay.

Figure 6:
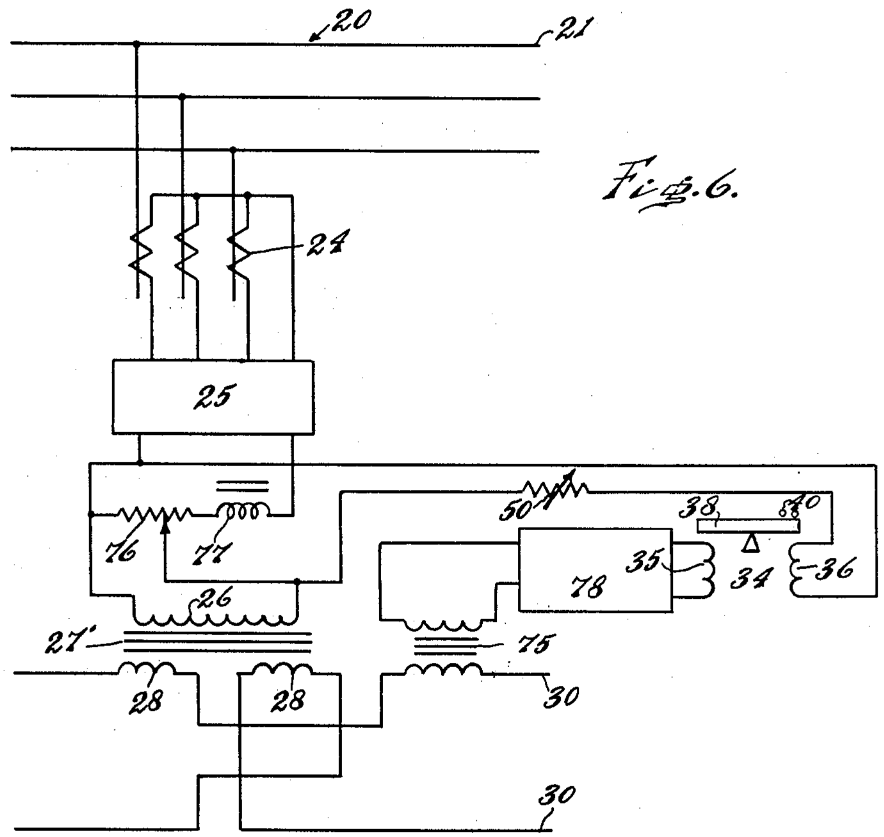
FIGURE 6 is a fragment of FIGURE 5 showing further details in the circuit of FIGURE 5.

FIGURE 6 illustrates a fragment of FIGURE 5 in which the relay connections are illustrated for applying the differential relay circuit of FIGURE 2 to the intermediate terminal of FIGURE 5. In this case additional attenuation and phase correction for the intermediate terminal is provided by resistor 76 and inductor 77 which are connected across the output of the mixer network 25. The bridging transformer primarily is connected across the potentiometer 76 to the tap. Each secondary of the bridging transformer is connected in an opposite side of the pilot wire circuit to balance the circuit to ground. In this case the bridging transformer provides the insulating function of the insulating transformers 33 shown in FIGURE 1 and are insulated accordingly. The insulating current transformer 75 is introduced to one of the pilot wires, and its secondary is connected to the input of current amplifier 78, whose output is connected to the operating coil of differential relay 34. The restraint coil of differential relay 34 is connected through variable resistor 50 across the input to the bridging transformer as shown in FIGURE 6.

Assuming that the leakage impedance involved in the center bridging transformer including the series capacitor used in the monitoring circuit are equal to $Z'_t$, and that the other assumptions previously made in connection with the development of Equations 1 to 17 are employed, $\theta$ represents the hyperbolic phase angle of the entire pilot wire. By transmission line theory, if the pilot wire sections are electrically of equal length $$e_1 = e_3' \cosh \theta/2 + i_3 Z_o \sinh \theta/2 \text{ volts} \qquad (26)$$

$$e_3 = e_2 \cosh \theta/2 + i_2 Z_o \sinh \theta/2 \text{ volts} \qquad (27)$$

$$i_1 = i_3 \cosh \theta/2 + \frac{e_3'}{Z_o} \sinh \theta/2 \text{ amperes} \qquad (28)$$

$$i_3 = i_2 \cosh \theta/2 + \frac{e_2}{Z_o} \sinh \theta/2 \text{ amperes} \qquad (29)$$

With voltage $V_1$ applied $$e_1'=i_1Z_t+e_1;\ e_3'=i_3Z_t'+e_3;\ e_2'=e_2-i_2Z_t \text{ volts} \quad (30)$$

$$i_2=e_2'/Z_2 \text{ amperes} \quad (31)$$

The resulting solution is given by the expression $$e_1'=e_2'\left[\left(1+\frac{2Z_t}{Z_2}\right)\cosh\theta+\left\{\frac{Z_t}{Z_o}\left(1+\frac{Z_t}{Z_2}\right)+\frac{Z_o}{Z_2}\right\}\sinh\theta+\frac{Z_t'}{Z_o}\left\{\frac{Z_o}{Z_2}\cosh^2\frac{\theta}{2}+\left(1+2\frac{Z_t}{Z_2}\right)\sinh\frac{\theta}{2}\cosh\frac{\theta}{2}+\frac{Z_t}{Z_o}\left(1+\frac{Z_t}{Z_2}\right)\sinh^2\frac{\theta}{2}\right\}\right]$$

$$=A'e_2'=A'E_{21} \text{ volts} \quad (6a)$$

$$i_1=\frac{e_2'}{Z_o}\left[\frac{Z_o}{Z_2}\cosh\theta+\left(1+\frac{Z_t}{Z_2}\right)\sinh\theta+\frac{Z_t'}{Z_o}\sinh\frac{\theta}{2}\left\{\frac{Z_o}{Z_2}\cosh\frac{\theta}{2}+\left(1+\frac{Z_t}{Z_2}\right)\sinh\frac{\theta}{2}\right\}\right]$$

$$=B'\frac{e_2'}{Z_o} \text{ volts} \quad (7a)$$

$$i_{31}=\frac{e_2'}{Z_o}\left[\frac{Z_o}{Z_2}\cosh\frac{\theta}{2}+\left(1+\frac{Z_t}{Z_2}\right)\sinh\frac{\theta}{2}\right]$$

$$=D\frac{e_2'}{Z_o}=\frac{D}{Z_o}\frac{V_1}{A'}(1-Z_1/Z_m) \text{ amperes} \quad (32)$$

Where $Z_1$ and $Z_2$ are given by Equations 11 and 5 using the value of $Z_n$ as given by $$Z_n=\frac{A'}{B'}Z_o \text{ ohms} \quad (9a)$$

With voltage $V_3$ only applied $$V_3=e_3+i_3Z_t'/2 \text{ volts} \quad (33)$$

$$i_1=-e_1'/Z_2 \text{ amperes} \quad (34)$$

The resulting solution is $$V_3=e_2'\left[\left(1+\frac{Z_t+Z_t'/2}{Z_2}\right)\cosh\frac{\theta}{2}+\left\{\frac{Z_o}{Z_2}+\frac{Z_t'}{2Z_o}\left(1+\frac{Z_t}{Z_2}\right)\right\}\sinh\frac{\theta}{2}\right]$$

$$=Ce_2'=CE_{23}=-CE_{13} \text{ volts} \quad (35)$$

$$i_{33}=D\frac{e_2'}{Z_o}=\frac{D}{Z_o}\frac{V_3}{C} \text{ amperes} \quad (36)$$

With voltage $V_2$ only applied, noting the reversed connections to the bridging transformer at that point, the resultant voltages at $E_2$ and $E_1$ are $$E_{22}=-V_2\frac{Z_1}{Z_m} \text{ volts} \quad (37)$$

$$E_{12}=\frac{V_2}{A'}(1-Z_1/Z_m) \text{ volts} \quad (38)$$

$$i_{32}=-D\frac{e_1'}{Z_o}=-\frac{D}{Z_o}\frac{V_2}{A'}(1-Z_1/Z_m) \text{ amperes} \quad (39)$$

Therefore with all three voltages applied simultaneously $$E_1=E_{12}+E_{13}+E_{11}=\frac{V_2}{A'}-\frac{V_3}{C}-\frac{Z_1}{Z_m}\left(V_1+\frac{V_2}{A'}\right) \text{ volts} \quad (40)$$

$$E_2=E_{21}+E_{23}+E_{22}=\frac{V_1}{A'}+\frac{V_3}{C}-\frac{Z_1}{Z_m}\left(V_2+\frac{V_1}{A'}\right) \text{ volts} \quad (41)$$

$$i_3=i_{31}+i_{33}+i_{32}=\frac{D}{Z_o}\left[\frac{(V_1-V_2)(1-Z_1/Z_m)}{A'}+\frac{V_3}{C}\right] \text{ amperes} \quad (42)$$

If the network supplying the center bridging transformer is so designed that its voltage output per ampere input is attenuated and shifted in phase angle with respect to the networks supplying the end terminals according to the relationships $$V_1=KI_1;\ V_2=KI_2;\ V_3=\frac{C}{A'}KI_3 \text{ volts} \quad (43)$$

then Equations 38–40 may be written as $$E_1=K\left[\frac{I_2-I_3}{A'}-\frac{Z_1}{Z_m}\left(I_1+\frac{I_2}{A'}\right)\right] \text{ volts} \quad (40a)$$

$$E_2=K\left[\frac{I_1+I_3}{A'}-\frac{Z_1}{Z_m}\left(I_2+\frac{I_1}{A'}\right)\right] \text{ volts} \quad (41a)$$

$$i_3=\frac{KD}{A'Z_o}\left[I_1+I_3-I_2-\frac{Z_1}{Z_m}(I_1-I_2)\right] \text{ amperes} \quad (42a)$$

It will be evident from the mathematical computations that the insulating transformers 33 for best results should have as high a magnetizing impedance as possible. This is particularly true where D.C. monitoring current is flowing through the transformer.

In order to obtain effective operation of insulating transformers in the pilot wire system of the invention, it is important that high magnetizing impedance be provided relative to the characteristic impedance of the pilot wire circuit in the insulating transformers. The ratio should be of the order of 10 to 1 or higher but at least substantially in any case in excess of 5 to 1.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a pilot wire relay device for use with a transmission line, a plurality of current transformers respectively associated with the conductors of the line and responsive to the condition of each conductor of the line at each end thereof, summation network means at each end of the line connected to the current transformers there located for producing therefrom at the particular end a single voltage proportional to the current conditions in the different conductors of the transmission line at said particular end, bridging transformer means at each end of the line having connections to said summation network means at the adjacent end, a pilot wire circuit interconnecting the bridging transformer means, means at each end respectively connected to the bridging transformer means and to the pilot wire circuit at the particular end for bringing into phase relation and magnitude relation for comparison pair of voltages at each end, one voltage of said pair being responsive to the condition at the far end and the other voltage of each pair being responsive to the condition at the near end, comparison means located at each end for relatively comparing the pair of voltages at each respective end, and means located at each end of the transmission line for indicating the respective comparisons of the pairs of voltages.

2. A device of claim 1, in which the bridging transformer means has a primary winding in circuit with the summation network means, and a secondary winding in circuit with the pilot wires.

3. A device of claim 1, in which there are two windings associated with each bridging transformer means and in circuit with the pilot wires.

4. A device of claim 1, in which the bridging transformer means at each end includes a terminating impedance network.

5. A device of claim 1, which the means at each end for bringing into phase relation and magnitude relation for comparison a pair of voltages, comprises means for shifting phase and attenuating the voltage at the near end for comparison with the voltage at the far end.

6. A device of claim 1, in which the means at each end for bringing into phase relation and magnitude relation for comparison a pair of voltages, comprises means for shifting the phase and amplifying the far end voltage for comparison with the voltage at the near end.

7. A device of claim 1, in which the means at each end for bringing into phase relation and magnitude relation for comparison a pair of voltages, comprises means for shifting the phase of the far end voltage and attenuating the voltage at the near end.

8. A device of claim 1, in which the indicating means is associated with relay means.

9. A device of claim 1, in which the pilot wire circuit includes impedance network means for shifting the electrical center of the pilot wires.

10. A device of claim 9, in which said insulating transformers have a ratio of magnetizing impedance to characteristic impedance of the pilot wire circuit in excess of 5 to 1.

11. A device of claim 10, in which said ratio exceeds 10 to 1.

12. A device of claim 1, for use with a transmission line having an intermediate terminal, in combination with a plurality of current transformers respectively associated with the conductors leading to the intermediate terminal, and responsive to the condition of each conductor of the line leading to the intermediate terminal, summation network means connected to the current transformers which are responsive to the condition of each conductor of the line leading to the intermediate terminal for producing therefrom a single voltage proportional to the current conditions in the different conductors of the line leading to the intermediate terminal, bridging transformer means having connection to said summation network means for the line leading to the intermediate terminal, said bridging transformer means being connected in circuit with said pilot wire circuit at the electrical center of the pilot wires.

13. A device of claim 12, in combination with an impedance network in circuit with the pilot wires for locating the position of the electrical center of the pilot wires at said bridging transformer.

14. A device of claim 1, in which the indicating means includes means for rectifying the differential voltage obtained from the comparison means, means for rectifying a restraint voltage which is responsive to the near end voltage, means for comparing the rectified restraint voltage with said differential voltage, and means for indicating the result of the comparison last mentioned.

15. A device of claim 1, in which the indicating means comprises means for establishing a restraint voltage responsive to the near end voltage, means for establishing a differential voltage which is produced by the comparison means, means for rectifying the restraint voltage, means for rectifying the differential voltage, means for taking off a portion of the rectified restraint voltage, and for comparing said portion of the rectified restraint voltage with the rectified differential voltage by series opposition.

16. A device of claim 15, in combination with means for shifting the phase of the restraint voltage to bring it into phase consonance with said differential voltage.

17. In an indicator device, a restraint transformer having a primary and a secondary provided with an intermediate tap, an operating transformer having a primary and a secondary provided with an intermediate tap, means for supplying a restraint voltage to the primary of the restraint transformer, means for supplying an operating voltage to the primary of the operating transformer, a full wave rectifier connected to the secondary of the restraint transformer, a full wave rectifier connected to the secondary of the operating transformer, a potentiometer connected across the output of the full wave rectifier connected to the secondary of the restraint transformer, amplifier means having input and output connections, the output of the full wave rectifier connected to the secondary of said operating transformer in series opposition to the output of said potentiometer being connected to the input connections of said amplifier means, and indicating means connected to the output connections of said amplifier means.

References Cited in the file of this patent

UNITED STATES PATENTS

| | | |
|---|---|---|
| 1,953,108 | Harder | Apr. 3, 1934 |
| 2,508,198 | Sonnemann | May 16, 1950 |
| 2,678,418 | Black | May 11, 1954 |
| 2,953,722 | Willis | Sept. 20, 1960 |

FOREIGN PATENTS

| | | |
|---|---|---|
| 856,122 | France | May 30, 1940 |
| 688,594 | Great Britain | Mar. 11, 1953 |
| 718,815 | Great Britain | Nov. 24, 1954 |

OTHER REFERENCES

Terman: "Electronic and Radio Engineering," 1955, McGraw-Hill Book Company, New York, N.Y., pages 345–347 and 113–116 relied on.